Patented Aug. 23, 1932

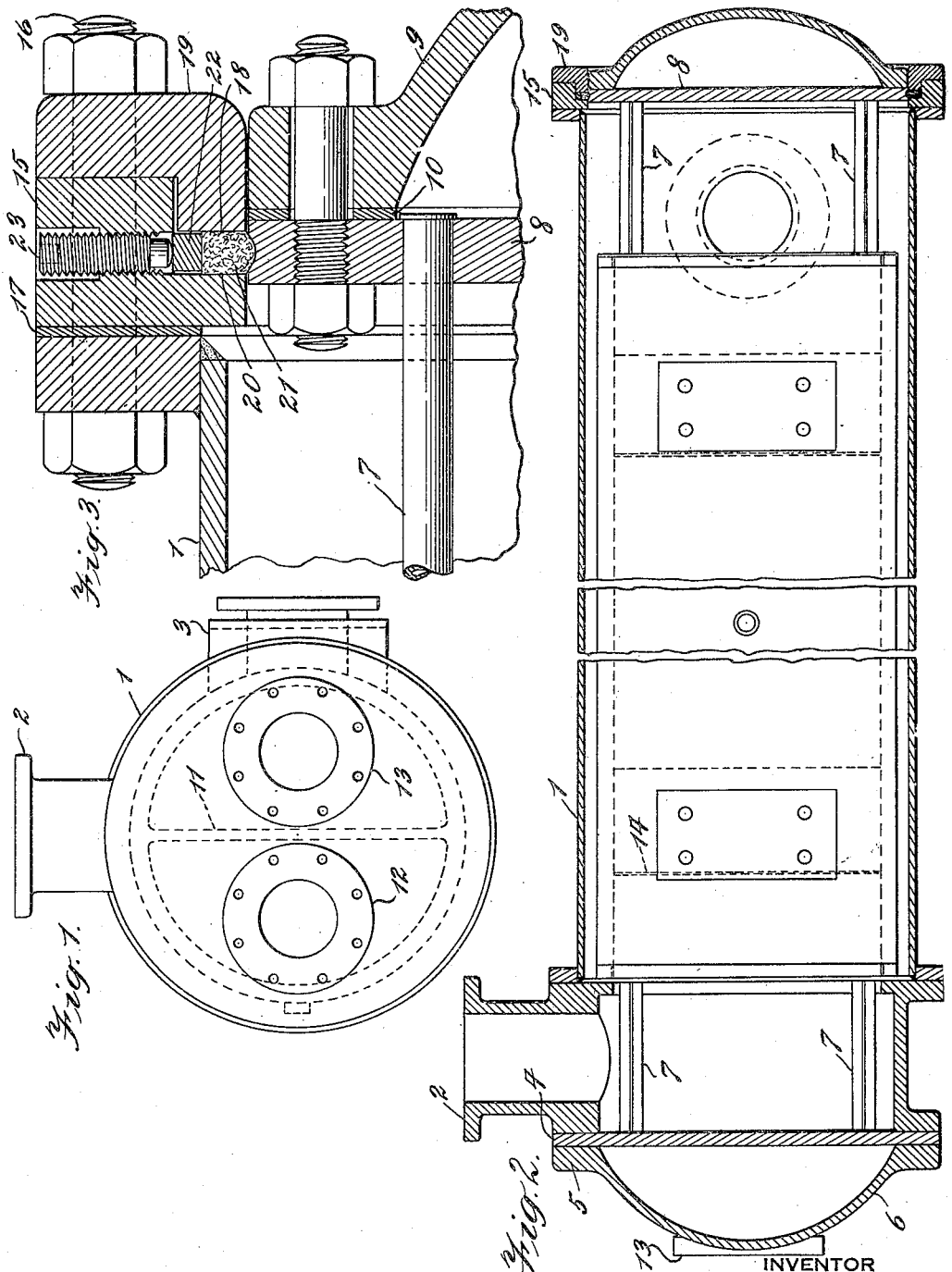

1,873,825

UNITED STATES PATENT OFFICE

HOWARD C. DAVIS, OF ELIZABETH, NEW JERSEY, ASSIGNOR TO DAVIS ENGINEERING CORPORATION, A CORPORATION OF DELAWARE

EXPANSION JOINT

Application filed June 29, 1929. Serial No. 374,626.

My invention relates to an expansion joint. Particularly, my invention contemplates a fluid tight joint between two members one of which is subjected to changes in temperature which causes expansion and contraction thereof.

In heat exchangers, condensers and the like in which it is necessary to provide fluid tight joints between elements and in which the elements are subjected to varying temperatures and consequently unequal expansion, various types of expansion joints have been provided. For example, in condensers, heat exchangers or the like utilizing tubes and attendant tube sheets it is necessary to provide for the expansion and contraction of the tubes. Otherwise strains would be set up and leakage result. In one instance, it has been the practice to compensate for the expansion and contraction of the tubes by providing an auxiliary head within the head of the casing attached to a floating tube sheet. This construction necessitated an added head which increased the weight and bulk of the unit.

By my invention, the additional head is unnecessary as the head attached to the tube sheet may serve as the head of the casing. I employ a fluid tight joint which permits, within limits, relative movement between the united members.

Among the characteristics of my invention is the fact that the pressure on the packing between the members may be varied at will and the packing may be replaced without disassembling the unit.

Specifically, I employ a construction in which a depression or groove is cut in the outer periphery of the movable member. In the stationary member, there is an annular groove, preferably rectangular in cross section, in alignment with the groove in the peripheral edge of the movable member. Flexible packing in the groove in the stationary member extends into and fills the groove in the movable member. The packing is backed by an expansion ring which is pressed inwardly by a plurality of set screws in threaded openings provided therefor. A flange having a lateral projection, the edge of which forms one side of the annular groove in the casing, is removably secured to the end of the casing. Thus, by advancing or retracting the set screws the pressure on the packing may be increased or decreased at will and by the simple expedient of removing the end flange, the joint may be repacked.

My invention comprehends other features and advantages which will hereinafter more particularly appear.

I shall now describe one embodiment of my invention in connection with the accompanying drawing in which:—

Fig. 1 is an end view of an oil cooler embodying my invention.

Fig. 2 is a longitudinal central section of the same; and

Fig. 3 is an enlarged fragmentary section showing the details of the expansion joint.

For the purpose of illustration, I have shown an expansion joint embodying my invention between the casing and floating tube sheet of a two pass oil cooler. The oil cooler comprises a cylindrical casing 1 having an oil inlet and an outlet 2 and 3 respectively. At one end of the casing, a tube sheet 4 is secured between the edge of the casing and a flange 5 on a head 6. A series of tubes 7 are secured at one end in the tube sheet 4 and run longitudinally of the casing, being secured at the opposite end in a floating tube sheet 8 to which a floating head 9 is secured. Suitable packing 10 is provided between the flange on the head 9 and the tube sheet 8. The chamber formed by the head 6 and the tube sheet 4 is divided into two compartments by a wall 11, half of the tubes entering the tube sheet in each compartment. The cooling water is admitted to one of the compartments through an inlet 12, flows through the tubes communicating with that compartment to the chamber formed by the head 9 and tube sheet 8, and is returned through the remaining half of the tubes to the outlet 13. A series of baffles 14 are provided within the casing 1 and serve to force the oil entering the oil inlet 2 to take a serpentine or cross flow through the casing.

Due to the changes in temperature to which the tubes 7 are subjected, they expand and contract. In order to prevent the expansion and contraction of the tubes from setting up strains that would cause leakage, the tube sheet 8 is movably mounted in the casing. However, it is necessary that the connection between the casing and the tube sheet be fluid tight in order to prevent leakage to the atmosphere.

In the oil cooler shown the floating tube sheet 8 is surrounded by a circular flange 15 secured to the edge of the casing by bolts 16, suitable packing 17 being interposed between the edge of the casing and the flange. On its inner periphery, the flange 15 has a cutaway portion as shown and forms with the tube sheet 8 and head 9 secured thereto a circular groove concentric with the casing. A lateral projection 18 on a flange 19 secured to the flange 15 by the bolts 16 is adapted to project into the groove so formed. The edge of the lateral projection 18 forms with a side 20 of the cutaway portion of the flange 15 an inwardly opening annular groove directly outward from the edge of the tube sheet 8. Into the groove so formed, packing 21 is placed and extends into a groove formed in the outer peripheral edge of the tube sheet 8. Behind the packing, within the groove, a split or segmental ring 22 is placed and serves as a backing strip for the packing 21. The radius of curvature of the ring 22 is adjustable to vary the pressure on the packing, set screws 23 being provided at suitable intervals in the flange 15 for that purpose.

The joints so formed, by virtue of the flexible packing permits relative movement between the tube sheet and the casing, and maintains a fluid tight connection. Furthermore, the joint may be easily and readily repacked without disassembling the cooler. Repacking may be accomplished by removing the flange 19.

It is obvious that various changes may be made in the illustrated embodiment above particularly described within the principle and scope of my invention as expressed in the appended claims.

Claims:

1. An expansion joint comprising a fixed outer member having a groove in its inner face, an inner member fitting within the outer member and having a groove in its fitting face opposing that in the outer member, the inner member being movable transversely of said grooves relative to the outer member under normal conditions of use, a packing disposed in both grooves, such packing being yieldable to provide for said relative movement while still preserving a seal between said members, inwardly adjustable compression means in the outer groove bearing against the outer face of the packing, means to adjust the compression means and thereby vary the pressure upon the packing, and means providing for the removal and replacement of said packing while said inner member is left in place within said outer member.

2. An expansion joint comprising a fixed outer annular member having a circumferential groove in its inner face, an inner member fitting within the outer member and having a circumferential peripheral groove opposing that in the outer member, the inner member being axially movable relative to the outer member under normal conditions of use, a packing disposed in both grooves, the packing being yieldable to provide for said relative movement while still preserving a seal between said members, radially adjustable compression means in the outer groove bearing against the outer face of the packing, means to adjust the compression means and thereby vary the pressure upon the packing, and a separable detachably secured annulus constituting one of the side walls of the groove in said outer member to provide an opening through which said packing and its said compression means may be removed and replaced with said inner member fitting within said outer member.

3. An expansion joint for a heat-exchange device comprising the combination of a fixed outer cylindrical member, a fixed head and a fixed tube sheet secured on and closing one end of said outer member and forming a chamber between them, a congeries of heat-transfer tubes having ends secured in the fixed tube sheet and extending longitudinally through said outer member, an inner closure member fitting within the other end of said outer member and comprising a tube sheet in which the adjacent ends of said tubes are secured and a head secured at its periphery to this latter tube sheet and shaped to form a chamber therewith, said inner member being axially movable relative to said outer member under normal conditions of use through variations of expansion and contraction, said outer member having a circumferential groove in its inner face outward from the periphery of said inner member and said inner member having a circumferential peripheral groove opposing that in the outer member, a unitary packing disposed in both grooves, said packing being yieldable to provide for said relative movement while still preserving a seal between said inner and outer members, radially adjustable compression means in the outer groove bearing against the outer face of the packing, and means to adjust the compression means and thereby vary the pressure upon the packing.

4. The invention defined in claim 1, in which one of the side walls of the groove in said outer member is detachable to provide an opening through which said packing may be removed and replaced.

5. The invention defined in claim 2, in which said compression means is formed by a backing strip encircling said packing, said means to adjust the compression means being screw means bearing against the outer face of the backing strip, and means for detachably securing said annulus in place.

6. The invention defined in claim 3, in combination with a separable detachably secured annulus constituting one of the side walls of the groove in said outer member to provide an opening through which said packing and its said compression means may be removed and replaced with said inner member fitting within said outer member.

7. An expansion joint comprising a fixed outer annular member having a circumferential groove in its inner face, a circular inner member fitting within the outer member and being axially movable relative to the outer member under normal conditions of use, a yieldable packing disposed in said groove to provide a seal between said members, a radially adjustable compression strip in the groove encircling and bearing against the radially outer face of the packing, screw means bearing against the radially outer face of the compression strip to adjust the latter directly radially inward and thereby vary the inward pressure upon the packing, and a separable detachably secured annulus constituting one of the side walls of the groove in said outer member to provide an opening through which said packing and its compression strip may be removed and replaced with said inner member fitting within said outer member.

8. An expansion joint for a heat-exchange device comprising the combination of a fixed outer cylindrical member, a fixed head and a fixed tube sheet secured on and closing one end of said outer member and forming a chamber between them, a congeries of heat-transfer tubes having ends secured in the fixed tube sheet and extending longitudinally through said outer member, an inner closure member fitting within the other end of said outer member and comprising a tube sheet in which the adjacent ends of said tubes are secured and a head secured at its periphery to this latter tube sheet and shaped to form a chamber therewith, said inner member being axially movable relative to said outer member under normal conditions of use through variations of expansion and contraction, said outer member having a circumferential groove in its inner face outward from the periphery of said inner member, a packing disposed in said groove, said packing being yieldable to provide a seal between said inner and outer members, a radially adjustable compression strip in the said groove encircling and bearing against the radially outer face of the packing, and screw means bearing against the radially outer face of the compression strip to adjust the latter directly radially inward and thereby vary the inward pressure upon the packing.

9. The invention defined in claim 8, in combination with a separable detachably secured annulus constituting one of the side walls of the groove in said outer member to provide an opening through which said packing and its said compression strip may be removed and replaced with said inner member fitting within said outer member.

10. An expansion joint for a heat-exchange device comprising a fixed outer cylindrical member, a fixed tube sheet secured on and closing one end of said outer member, a congeries of heat-transfer tubes having ends secured in the fixed tube sheet and extending longitudinally through said outer member a movable tube sheet fitting within and closing the other end of the said outer member and in which the adjacent ends of said tubes are secured, said movable tube sheet being axially movable relative to said outer member under normal conditions of use through variations of expansion and contraction, said outer member having a circumferential groove in its inner face outward from the periphery of said movable tube sheet, a packing disposed in said groove, said packing being yieldable to provide a seal between said outer member and movable tube sheet, a radially adjustable compression strip in the said groove encircling and bearing against the radially outer face of the packing, and screw means bearing against the radially outer face of the compression strip to adjust the latter directly radially inward thereby to vary the inward pressure upon the packing.

In witness whereof, I hereunto subscribe my signature.

HOWARD C. DAVIS.